March 27, 1962 F. CARRARD 3,026,978
ELECTROMAGNETIC BRAKE AND CONTROL THEREFOR
Filed Feb. 17, 1958 4 Sheets-Sheet 1
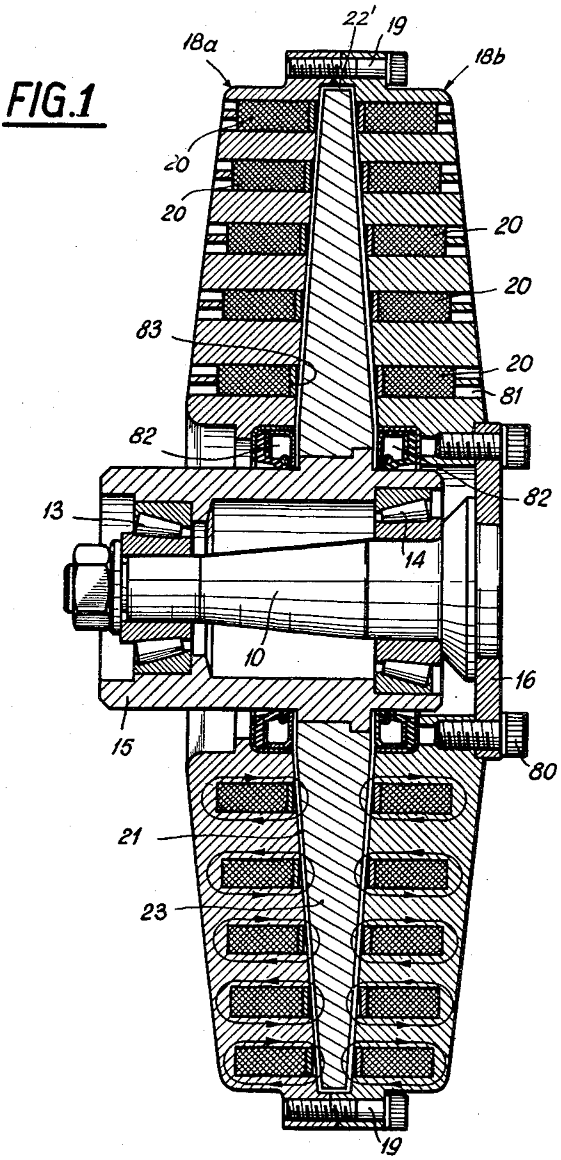
Inventor:
Florentin CARRARD
by J. Delattre-Seguy
Attorney

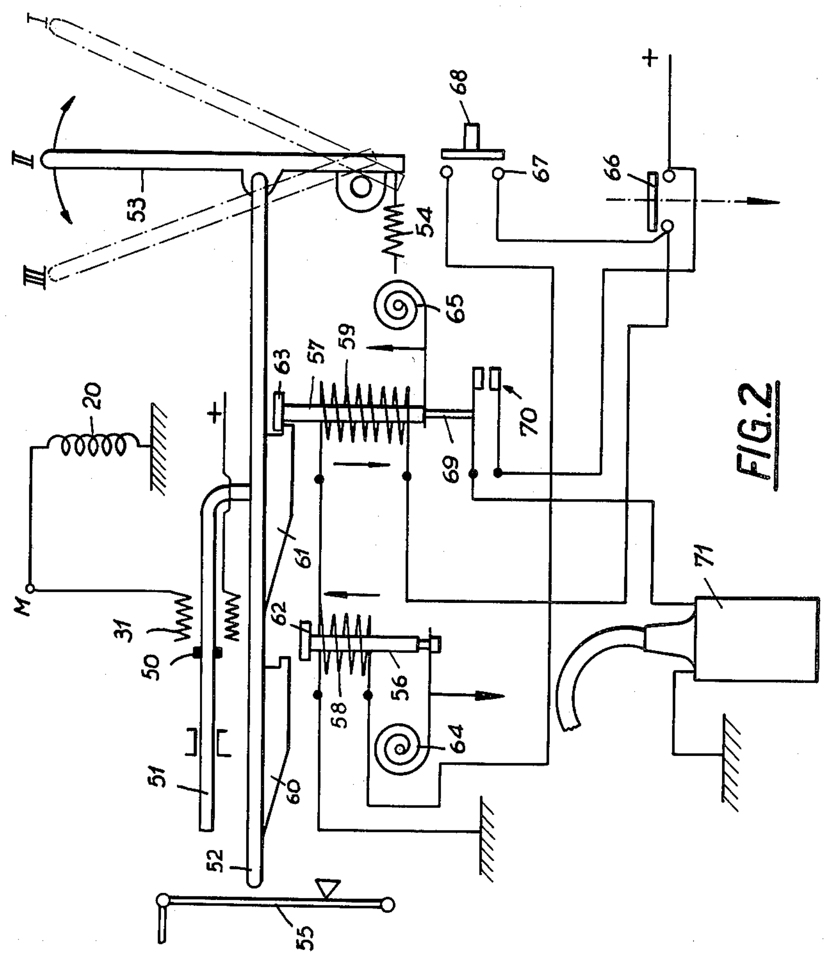
Inventor:
Florentin CARRARD
by: J. Delattre-Seguy
Attorney

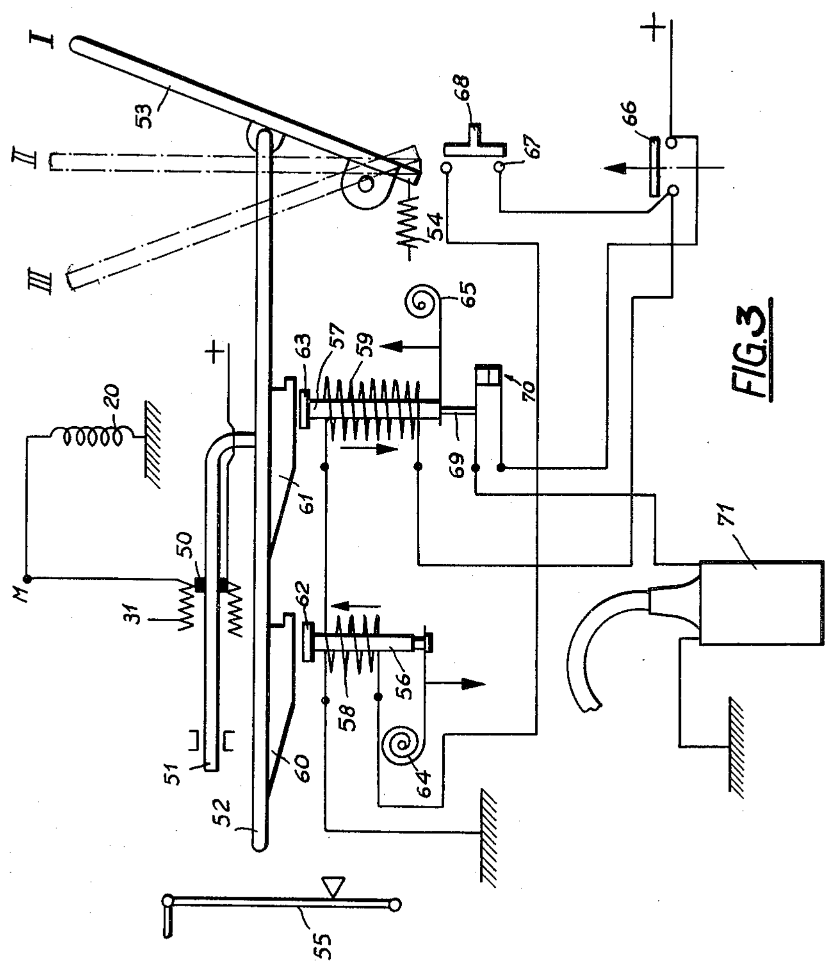
Inventor:
Florentin CARRARD
by J. Delattre Seguy
Attorney

ELECTROMAGNETIC BRAKE AND CONTROL THEREFOR
Filed Feb. 17, 1958
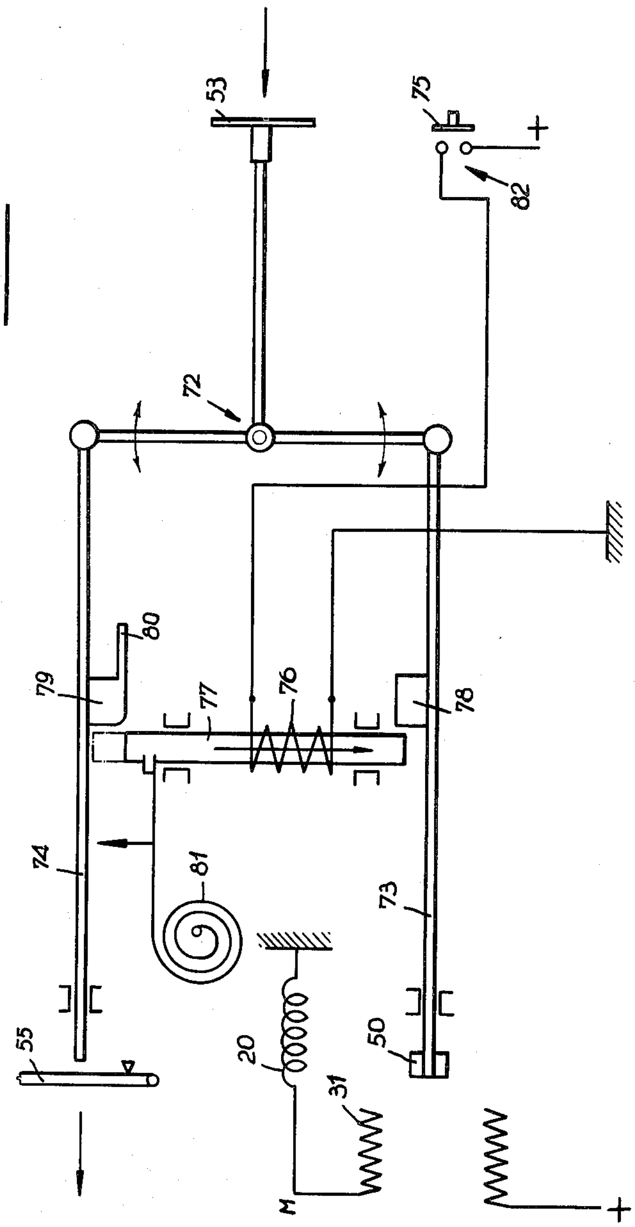
Inventor:
Florentin CARRARD
by: J. Delattre-Seguy
Attorney 3,026,978
Patented Mar. 27, 1962

3,026,978

ELECTROMAGNETIC BRAKE AND CONTROL THEREFOR

Florentin Carrard, Rue du Vieux College 20, Prilly, Switzerland, assignor of one-half to André Siegenthaler, Lausanne, Switzerland Filed Feb. 17, 1958, Ser. No. 715,560
Claims priority, application Switzerland Feb. 16, 1957
7 Claims. (Cl. 192—3)

My invention has for its object an electromagnetic brake of the type including an electromagnet carried by a stator and the magnetic circuit of which includes a body of magnetic metal powder located to either side of a disc of magnetic metal rigid with the rotary member to be braked, the winding of the electromagnet being adapted to act on said magnetic disc to obtain a braking of said disc with reference to the stator.

My invention has for its object improvements in such brakes, wherein the windings of the electromagnet are distributed in successive grooves surrounding the rotary member in the manner disclosed hereinafter, reference being made to the accompanying drawings, wherein:

FIG. 1 is a cross-section of our improved brake;

FIGS. 2, 3 and 4 illustrate a mechanism controlling the braking circuit, FIGS. 2 and 3 being elevational views of said mechanism in two different conditions and FIG. 4 showing modifications thereof, as seen from above.

In said drawings, 10 designates the steering swivel and 13 and 14 roller bearings on which the hub 15 of the wheel to be braked rotates. The stationary portion of the brake is constituted by an electromagnet, the magnet circuit of which includes two sections or plates 18*a* and 18*b* facing each other, while the electric circuit of said electro-magnet is formed correspondingly by two series of coaxial windings 20.

The two plates 18*a* and 18*b* assembled together through screws 19 are secured to a carrier 16 by screws 80. The carrier 16 is adapted to be fitted on the forked member which is not illustrated and which carries the wheel pivot. The plates 18*a* and 18*b* are provided in their inner surfaces with annular recesses inside which are fitted the windings 20 of the electro-magnet. The outer surfaces of said plates are provided with bores 81 opening into said grooves and through which the wires feeding the windings extend. These plates are shaped so as to form between them an annular gap 21 inside which is housed a disc 23 keyed to the hub 15. The cross-sections of said disc and of the gap enclosing it in a plane passing through the wheel axis have a thickness which decreases from the axis towards the periphery of the brake.

The free space between the rotary disc 23 and the plates 18*a* and 18*b* is filled with a mass 22' of a metal powder incorporating some graphite. Said space is sealed fluid-tightly by two packing systems 82 fitted between the hub 15 and the plates 18 and by annular washers 83 covering the inner ends of the recesses housing the windings.

The windings are interconnected in series so that the magnetic fields produced by the successive windings of each half-circuit add their actions, as shown by the arrows.

The particular double cone shapes given to the gap and to the disc housed therein are such as will render substantially equal the braking forces produced by each elementary winding. The reduction in the thickness of the disc 23 from the inside towards the outside of the brake has, in fact for its consequence the shaping of the disc as a body of unvarying resistance throughout its radius.

The operation of the brake relies on the fact that the metal particles filling the gap form a solid mass and have a tendency to adhere to the cooperating surfaces of the plate 23 and of the cores 18 when they are subjected to the magnetic field produced by the winding 20. The frictional action exerted on said surfaces by the particles is all the higher when the magnetic field is more intense and, consequently, for adjusting the braking power, it is sufficient to energize more or less the electro-magnet. Said mechanical braking is reinforced at high speeds of rotation by the electromagnetic braking exerted by eddy currents.

The pulverulent metal may, in certain cases, be admixed with an oil of a suitable viscosity or with another liquid.

It is also possible to use pulverulent iron which has just been subjected to a hardening or the like thermal treatment or else to a treatment bestowing the metal particles with a permanent magnetisation so that said particles may adhere together in the absence of any external magnetic field and so that they may be thus subjected to no continuous stirring when the wheel revolves and the windings are not energized. In order to reduce the wear of the surfaces in contact with the powder, it is also possible to coat said surfaces with chromium or with a ceramic cover.

Lastly, in order that the windings may not be subjected to excessive temperatures, it is possible to embed them in ceramic or the like refractory material.

FIGS. 2 and 3 illustrate the first embodiment of the mechanism in two different conditions. In said mechanism, the slider 50 of the rheostat 31 is rigid with a rod 51 adapted to slide longitudinally together with a rod 52 to which it is welded. One of the ends of said rod 52 is pivotally secured to a pedal 53 subjected to the action of a spring 54 which urges it back into the position illustrated at I in FIG. 3 when no other force acts on said pedal.

Said pedal travels over a path which is subdivided into two sections of which one extends from the position I already mentioned towards the medial position II illustrated in solid lines in FIG. 2 while the second section of said path extends from said position II towards the position III shown in interrupted lines in said FIG. 2.

During the first section of said travel, the pedal 53 controls the brake and during the second section, it acts on the accelerator.

During the braking operation, the slider 50 is shifted from a first position for which the current energizing the coil 20 is a maximum into a position for which said current becomes zero. During the second section of the path of the pedal 53, the front end of the rod 52 acts on a pivoting member 55 connected with the movable member of the accelerator. Thus, the pivotal movement of the pedal 53 between the position I and the position III has for its result firstly a gradual release of the electro-magnetic brake and then a gradual acceleration of the speed of the engine.

The mechanism constituted by the different members described hitherto is provided with safety means including two electro-magnetic bolts including each a plunger core 56 or 57, a coil 58 or 59 inside which the corresponding core moves, a notched member 60 or 61 rigid with the rod 52 and adapted to cooperate with the head 62 or 63 of the plunger core and a spring 64 or 65 acting on the plunger. The springs 64 and 65 urge the bolt cores 56 and 57 in opposite directions, respectively downwardly and upwardly.

The coils 58 and 59 controlling the two bolts are inserted parallel. One of their ends is grounded through the mass of the vehicle while their other ends are connected with one of the terminals of a switch 66 adapted to be closed by the contact key of the automobile; the other terminal of said switch 66 is connected with the positive terminal of the battery. In the branch of the circuit including the winding 58 is also inserted a second switch 68 which is to be actuated by the left foot of the driver.

The core 57 is also provided at its lower end with an extension 69 secured to the movable blade of a third switch 70 inserted in series with the ignition coil 71 between ground formed by the mass and the positive terminal of the battery.

When the automobile is at a standstill, the safety arrangement is in the condition illustrated in FIG. 2. The head 63 of the core 57 which is subjected only to the action of the spring 65 engages the recess in the notched member 61. This holds the pedal 53 in its medial position II against the operation of the spring 54. The switch 70 is open and prevents the ignition coil 71 from being energized.

When starting the engine, the driver closes the switch 66 through the operation of his contact key after which he slightly depresses the pedal 53 so that the head 63 of the core 57 may be released with reference to the recess in the member 61 and consequently the core 57 drops under the action of its energized coil into its lower position and closes the switch 70. Thus the driver may start the engine and shift as desired the pedal 53 between its two extreme positions so as to provide for a braking or an acceleration.

The second electro-magnetic bolt has for its object to allow the driver to lay his right foot during the running of the automobile off the pedal 53 without the latter returning rearwardly of its position II which return movement would have for its consequence a sudden braking which would be dangerous since it would be performed fortuitiously.

The driver controls said second bolt through action on the push-member 68, which closes the switch 67 so that the circuit of the coil 58 is energized and raises the core 56 into its upper position. When this is obtained, the driver may release the pedal 53 without any risk since the recess in the notched member 60 engages the core 56 and holds the pedal 53 fast in its medial position for which no braking is performed. The pressure exerted by the push-button 68 may be of a short duration since the core 56 is held in its upper position by the notch in the member 60 as soon as the latter has receded into a position underneath the head 62 of the core 56.

To release the core 56 and to allow it to return under the action of the spring 64 into its lower position, the driver has merely to slightly depress the pedal 53 so that the head 52 of the core 56 may move past said member 60.

When the driver stops the automobile through a braking operation, as provided by allowing the pedal 53 to move to the rear of its medial position and wishes to leave the automobile with the safety means in the condition illustrated in FIG. 2, it is sufficient for him to switch the current off and to depress the pedal 53 until the core 57 rises under the action of its spring 65 into its upper position. At this moment, the engine stops, after which the driver releases the pedal which is held fast in its medial position for which the recess in the member 61 engages the head of the core 57 which is held against any further movement.

The second embodiment of this mechanism is illustrated in FIG. 4 and differs chiefly from the first embodiment through the fact that the path of the pedal 53 is not subdivided into two sections corresponding to a braking and to an acceleration, but acts between its two extreme positions selectively on the braking and on the accelerator as desired by the driver.

In said embodiment, the pedal 53 is connected with the brake and with the accelerator through the agency of a rocking lever 72 the control rod of which is pivotally connected with the pedal 53 while its two arms are constituted by the rods 73 and 74 which are longitudinally guided. The rod 73 carries the slider 50 of the rheostat 31 while the rod 74 is adapted to act on a pivoting member 55 connected with the movable member of the accelerator.

The driver selects the manner of operating of the pedal 53 by locking either of said rods. Said locking is controlled by a push-button 75 forming or controlling the movable section of a switch 82 and actuated by the driver's left foot; said locking is performed through the agency of an electro-magnetic bolt including a coil 76, a plunger core 77 adapted to be shifted axially inside said coil, stops 78 and 19 rigid respectively with the rods 73—74 and a spring 81 urging the core 77 towards its position illustrated in dot and dash lines in FIG. 3.

The stop 78 is constituted by a mere block the front and rear surfaces of which are flat while the stop 79 is provided with a longitudinal extension 80. The switch 82 is inserted between the positive terminal of the battery and one end of the coil 76 the other end of which is grounded.

When the current does not flow through the coil 76, the core 77 has a tendency to enter under the action of the spring 81 the position illustrated in dot and dash lines in FIG. 4, while in contradistinction, when the circuit of said coil is closed by the push-button 75, said core is urged into the position drawn in solid lines in said FIG. 4.

The operation of this mechanism is particularly simple: when the driver wishes to accelerate, it is sufficient for him to depress with his left foot the push-button 75 while at the same time he depresses with his right foot the pedal 53. This has for its result a downward shifting of the core 77 which releases the rod 74 and locks the rod 73. As soon as the pedal has left its inoperative position, the driver may release the pressure exerted on the push-button 75 without the core 77 which is in engagement with the inner surface of the extension 80 of the stop 79 being allowed to return into its original position. When the driver wishes to brake the automobile, he releases the pedal 53 which allows the core 77 to return under the action of the spring 81 into its position illustrated in dot and dash lines, so as to lock the rod 74 and to release the rod 73 after which he again depresses the pedal 53 which carries along with it the rod 73 in an axial direction.

The above disclosed embodiment is provided for the braking of a vehicle, but obviously it is possible to provide for the braking of any revolving member through our improved braking system. In particular, it is possible to provide for its fitting on a machine tool, an electric motor, a hydraulic machine such as a turbine or a pump, aircraft wheels or the like.

What I claim is:

1. An electromagnetic brake adapted to brake a rotary member, comprising a magnetic circuit including two rigidly interconnected stationary sections enclosing between them an annular gap coaxial with the rotary member and provided each with a plurality of radially spaced annular grooves coaxial with the rotary member and registering axially with the grooves in the opposite circuit sections, a plate of magnetic metal coaxially rigid with the rotary member to be braked and extending inside said gap, two sets of windings, the windings of each set being inserted in series and being carried inside the successive grooves in the corresponding circuit section in registry with the gap, a body of magnetic metal particles filling an annular section of the gap between the magnetic plate and each circuit section and means for feeding currents of equal adjustable intensities in series through both sets of windings.

2. An electromagnetic brake adapted to brake a rotary member, comprising a magnetic circuit including two rigidly interconnected sections enclosing between them an annular gap coaxial with the rotary member and provided each with a plurality of annular grooves coaxial with the rotary member, distributed along the radii of said sections and registering axially with the grooves in the opposite circuit section, a plate of magnetic metal in the shape of a double cone of a very flat cross-section coaxially rigid with the rotary member to be braked and extending inside said gap, two sets of windings, the windings of each set being inserted in series and being carried inside the successive grooves in the corresponding circuit section in registry with the gap, a body of magnetic metal particles filling an annular section of the gap between the magnetic plate and each circuit section and means for feeding current of equal adjustable intensities in series through both sets of windings.

3. In an automobile provided with wheels, an accelerator member and a pedal adapted to be shifted by the driver, the combination with each wheel of an electromagnetic brake adapted to brake a rotary member, comprising a magnetic circuit including two rigidly interconnected sections enclosing between them an annular gap coaxial with the rotary member and provided each with a plurality of annular grooves coaxial with the rotary member, distributed along the radii of said sections and registering axially with the grooves in the opposite circuit section, a plate of magnetic metal coaxially rigid with the rotary member to be braked and extending inside said gap, two sets of windings, the windings of each set being inserted in series and being carried inside the successive grooves in the corresponding circuit section in registry with the gap, a body of magnetic metal particles filling an annular section of the gap between the magnetic plate and each circuit section, means feeding current into each plurality of windings, a resistance inserted in said feeding means, and means whereby the depression of the pedal by the driver acts selectively on the resistance in the circuit of the electromagnet windings and on the accelerator member.

4. In an automobile provided with wheels, an accelerator member and a pedal adapted to be shifted by the driver, the combination with each wheel of an electromagnetic brake adapted to brake a rotary member, comprising a magnetic circuit including two sections rigid with each other, enclosing between them an annular gap and provided with a plurality of radially spaced annular grooves coaxial with the rotary member and registering axially with the grooves in the opposite circuit section, two sets of windings, the windings of each set being inserted in series and being each carried inside the successive grooves in the corresponding circuit section in registry with the gap, a body of magnetic metal particles filling an annular section of the gap, at least one plate of magnetic metal coaxially rigid with the wheel to be braked, arranged coaxially with the gap and extending inside an annular section of said gap, a circuit feeding the electromagnet widings, an elongated member connected with the pedal and adapted to slide axially under the control of the pedal, a rheostat inserted in the circuit feeding each electromagnet winding, a slider controlling said rheostat and controlled by said sliding member during a first section of the path allowed by the pedal, and means wherethrough the sliding member controls the accelerator member during a further section of the path followed by the pedal.

5. In an automobile provided with wheels, an accelerator member and a pedal adapted to be shifted by the driver, the combination with each wheel of an electromagnetic brake adapted to brake a rotary member, comprising a magnetic circuit including two sections rigid with each other, enclosing between them an annular gap and provided with a plurality of radially spaced annular grooves coaxial with the rotary member and registering axially with the grooves in the opposite circuit section, two sets of windings, the windings of each set being inserted in series and being carried each inside the successive grooves in the corresponding circuit section in registry with the gap, a body of magnetic metal particles filling an annular section of the gap, at least one plate of magnetic metal coaxially rigid with the wheel to be braked, arranged coaxially with the gap and extending inside an annular section of said gap, a circuit feeding the electromagnet windings, an elongated member connected with the pedal and adapted to slide axially under the control of the pedal, a rheostat inserted in the circuit feeding each electromagnet winding, a slider controlling said rheostat and controlled by said sliding member during a first section of the path allowed by the pedal, an electromagnetic bolt locking the sliding member and pedal system against movement over said first section of its path in an intermediate neutral position for which the pedal is located between the two sections of its path, and a push button within reach of the automobile driver adapted to energize said electromagnetic bolt.

6. In an automobile provided with wheels, an accelerator member, an ignition coil circuit and a pedal adapted to be shifted by the driver, the combination with each wheel of an electromagnetic brake adapted to brake a rotary member, comprising a magnetic circuit including two sections rigid with each other, enclosing between them an annular gap, and provided with a plurality of radially spaced annular grooves coaxial with the rotary member and registering axially with the grooves in the opposite circuit section, two sets of windings, the windings of each set being inserted in series and being each carried inside the successive grooves in the corresponding circuit section in registry with the gap, a body of magnetic metal particles filling an annular section of the gap, at least one plate of magnetic metal coaxially rigid with the wheel to be braked, arranged coaxially with the gap and extending inside an annular section of said gap, a circuit feeding the windings, an elongated member connected with the pedal and adapted to slide axially under the control of the pedal, a rheostat inserted in the circuit feeding each electromagnet winding, a slider controlling said rheostat and controlled by said sliding member during a first section of the path followed by the pedal, an electromagnetic bolt locking the sliding member and pedal system in an intermediate neutral position for which the pedal is located between two sections of its path, a push button within reach of the automobile driver adapted to energize said electromagnetic bolt, a further electromagnetic bolt, a circuit energizing the two bolts in parallel, a switch controlling last-mentioned circuit, said second bolt being adapted to lock the sliding member and pedal system in the same intermediate position upon closing of said switch, and means whereby said second bolt controls the circuit of the ignition coil to open said circuit feeding the latter whenever it locks the pedal in its intermediate position.

7. In an automobile provided with wheels, an accelerator member and a pedal adapted to be shifted by the driver, the combination with each wheel of an electromagnetic brake adapted to brake a rotary member comprising a magnetic circuit including two sections rigid with each other, enclosing between them an annular gap, and provided with a plurality of radially spaced annular grooves coaxial with the rotary member and registering axially with the grooves in the opposite circuit section, two sets of windings, the windings of each set being inserted in series and being carried each inside the successive grooves in the corresponding circuit section in registry with the gap, a body of magnetic metal particles filling an annular section of the gap, at least one plate of magnetic metal coaxially rigid with the wheel to be braked, arranged coaxially with the gap and extending inside an annular section of said gap, a circuit feeding the windings, a rocking lever operatively connected with the pedal, a rheostat controlling each circuit, a slider controlling the rheostat, two arms controlled by said lever selectively and one of which controls the sliders of the rheostats and the other controls the accelerator member, an electromagnetic bolt adapted to lock selectively against operation said arms of the rocking lever, a circuit feeding said electromagnetic bolt and a push button within reach of the driver controlling said last-mentioned circuit to allow selective operation of either arm by the rocking lever.

References Cited in the file of this patent

UNITED STATES PATENTS

| | | |
|---|---|---|
| 2,601,076 | Winther et al. | June 17, 1952 |
| 2,690,241 | Bachman | Sept. 28, 1954 |
| 2,840,206 | Logan | June 24, 1958 |
| 2,848,085 | Mannaioni | Aug. 19, 1958 |

FOREIGN PATENTS

| | | |
|---|---|---|
| 460,180 | Great Britain | Jan. 18, 1937 |
| 718,458 | Great Britain | Nov. 17, 1954 |
| 185,173 | Austria | Apr. 10, 1956 |